United States Patent Office 2,748,119
Patented May 29, 1956

2,748,119

6-FURYL AND 6-THIENYL DERIVATIVES OF 4-TRI-FLUOROMETHYL-2-PYRIMIDINAMINES

Kurt J. Rorig, Evanston, Ill., assignor, by mesne assignments, to G. D. Searle & Co., Skokie, Ill., a corporation of Delaware No Drawing. Application June 23, 1954,
Serial No. 438,863

11 Claims. (Cl. 260—256.4)

My present invention is concerned with trifluoromethyl derivatives of organic compounds containing two heterocyclic rings. More specifically, my invention relates to 6-furyl and 6-thienyl derivatives of 4-trifluoromethyl-2-pyrimidinamines and salts thereof. The compounds which constitute my invention can be represented by the general structural formula

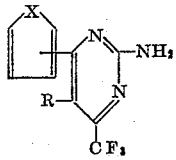

wherein R is either a hydrogen atom or a lower aliphatic hydrocarbon radical and X is a non-metallic element of periodic group VI.

In the foregoing structural formula the radical X is either oxygen or sulfur. The radical R is either hydrogen or a lower alkyl radical such as methyl, straight-chain or branched propyl, butyl, amyl, or hexyl. Also within the scope of my invention are compounds wherein R represents a lower alkenyl radical such as allyl, methallyl, crotyl, pentenyl, hexenyl, and the like.

The compounds of my invention are valuable because of their effect in cardiorenal disease and particularly in edema. They also have valuable antibacterial properties.

The pyrimidinamines of my invention form salts with a variety of inorganic and strong organic acids including sulfuric, phosphoric, hydrochloric, hydrobromic, sulfamic, citric, ascorbic and related acids. They also form quaternary ammonium salts with a variety of organic esters of sulfuric, hydrohalic and aromatic sulfonic acids which provide anions which are non-toxic in therapeutic dosages. Among such esters are methyl chloride and bromide; ethyl chloride, propyl chloride, butyl chloride, isobutyl chloride, benzyl bromide, phenethyl bromide, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

These compounds are conveniently prepared by the condensation of a lower 1-trifluoro-3-furoylalkanone or 1-trifluoro-3-thenoylalkanone of the structural formula

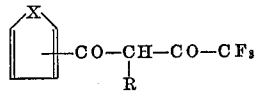

with guanidine in the presence of an alkaline condensing agent such as sodium methoxide. Lower alkanols are suitable solvents.

The following examples illustrate in further detail the compounds which constitute my invention and methods for their preparation. However, my invention is not to be construed as limited thereby in spirit or in scope. In these examples temperatures are indicated in degrees centigrade (° C.), pressures during vacuum distillation in millimeters (mm.) of mercury, and quantities of materials in parts by weight.

*Example 1*

To a solution of 505 parts of 1-trifluoro-3-(2'-furoyl)-acetone in 400 parts of ethanol are added 230 parts of guanidine carbonate and a solution of 135 parts of sodium methoxide in 400 parts of ethanol and 120 parts of water. The reaction mixture is permitted to stand at room temperature for a day and then refrigerated. A first crop is collected on a filter and the filtrate is heated and diluted with 3000 parts of hot water to induce precipitation of the second crop. Both crops are taken up in boiling ethanol and filtered. The filtrate is diluted with hot water. The 4-trifluoromethyl-6-furyl-2-pyrimidinamine thus obtained melts at about 148–149° C. It has the structural formula

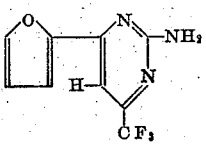

*Example 2*

A stirred solution of 10 parts of sodium in 185 parts of anhydrous ethanol is treated with 100 parts of 1-trifluoro-3-(2'-furoyl)acetone, heated to reflux and then treated with 77 parts of iodomethane. Refluxing and stirring are continued for 8 hours. The ethanol is removed by vacuum distillation with stirring and the residue is taken up in 200 parts of water and extracted with benzene. The benzene extract is washed with water and then distilled to yield 1-trifluoro-3-(2'-furoyl)-2-butanone as an oil which is distilled at about 100–105° C. and 14 mm. pressure.

A solution of 54 parts of the distillate in 50 parts of ethanol is treated first with 23 parts of guanidine carbonate and then with a solution of 13.5 parts of sodium methoxide in 40 parts of ethanol and 12 parts of water. After subsidence of the exothermic reaction, the mixture is permitted to stand at room temperature for 5 days and then chilled. An initial crop is collected on the filter and the filtrate is diluted with hot water to cause precipitation of the second crop. Both crops are boiled with ethanol and filtered and the filtrate is diluted with hot water. The resulting precipitate is collected on a filter. The 4-trifluoromethyl-5-methyl-6-furyl-2-pyrimidinamine is thus obtained in white, feathery needles. The hydrochloride is obtained by dissolving of these crystals in hot hydrochloric acid and chilling. The salt has the structural formula

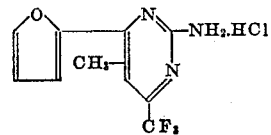

*Example 3*

To a solution of 48 parts of 1-trifluoro-3-(2'-thenoyl)-acetone in 900 parts of ethanol there are added successively 20.3 parts of guanidine carbonate and then a solution of 11.7 parts of sodium methoxide in 40 parts of ethanol and 20 parts of water. The orange solution is permitted to stand at room temperateure for 5 days after which the precipitate, consisting of long needles, is collected on a filter and extracted with boiling ethanol. Upon dilution of the ethanol solution with hot water, the 4-trifluoromethyl-6-thienyl-2-pyrimidinamine is obtained in long, thin needles melting at about 158–159° C. It has the structural formula

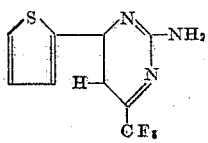

*Example 4*

A stirred solution of 24 parts of sodium in 450 parts of anhydrous ethanol is treated with 257 parts of 1-trifluoro-3-(2'-thenoyl)acetone, heated to reflux and then treated in the course of 10 minutes with 185 parts of 1-iodopropane. Refluxing and stirring are continued for 8 hours, after which the alcohol is distilled off under vacuum. The residue is dissolved in water and extracted with benzene. The benzene extract is washed with water, dried over anhydrous calcium sulfate, filtered and evaporated to yield 1-trifluoro-3-(2'-thenoyl)-2-hexanone which is distilled at 140–145° C. and about 10 mm. pressure.

To a stirred solution of 57 parts of the distillate in 110 parts of ethanol are added 20.3 parts of guanidine carbonate and then 11.7 parts of sodium methoxide in 40 parts of ethanol and 20 parts of water. The reaction mixture is permitted to stand at room temperature for a week, after which the crystalline precipitate is collected on a filter. A further yield can be obtained from the mother liquor by heating and dilution with water. The combined crystalline crops are boiled with ethanol and the insoluble material is removed by filtration. The filtrate is diluted with hot water and on cooling the 4-trifluoromethyl-5-n-propyl-6-thienyl-2-pyrimidinamine is obtained in long, white needles which are soluble in hot aqueous hydrochloric acid and in acetone but very poorly soluble in cold hydrochloric acid. The compound has the structural formula

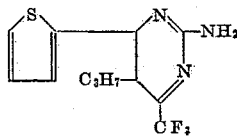

I claim:
1. A compound of the structural formula

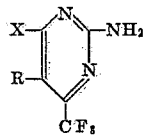

wherein R is a member of the class consisting of hydrogen and lower alkyl radicals and X is a member of the class consisting of furyl and thienyl radicals.

2. 4-trifluoromethyl-6-furyl-2-pyrimidinamine.
3. 4-trifluoromethyl-5-(lower alkyl)-6-furyl-2-pyrimidinamine.
4. 4-trifluoromethyl-5-methyl-6-furyl-2-pyrimidinamine.
5. 4-trifluoromethyl-6-thienyl-2-pyrimidinamine.
6. 4-trifluoromethyl-5-(lower alkyl)-6-thienyl-2-pyrimidinamine.
7. The process of preparing a compound of the structural formula

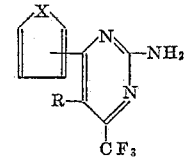

wherein R is a member of the class consisting of hydrogen and lower alkyl radicals and X is a member of the class consisting of oxygen and sulfur which comprises the condensation of guanidine with a compound of the structural formula

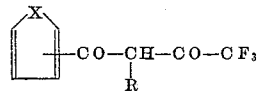

8. The process of preparing 4-trifluoromethyl-6-furyl-2-pyrimidinamine which comprises the condensation of guanidine with 1-trifluoro-3-(2'-furoyl)acetone.

9. The process of preparing 4-trifluoromethyl-5-(lower alkyl)-6-furyl-2-pyrimidinamine which comprises the condensation of guanidine with a 1-trifluoro-3-(2'-furoyl)-alkanone of the structural formula

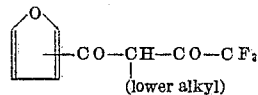

10. The process of preparing 4-trifluoromethyl-6-thienyl-2-pyrimidinamine which comprises the condensation of guanidine with 1-trifluoro-3-(2'-thenoyl)acetone.

11. The process of preparing a 4-trifluoromethyl-5-(lower alkyl)-6-thienyl-2-pyrimidinamine which comprises the condensation of guanidine with a 1-trifluoro-3-(2'-thenoyl)alkanone of the structural formula

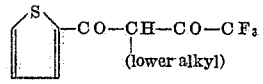

No references cited.